F. E. WILLITS.
WIRE FABRIC MACHINE.
APPLICATION FILED FEB. 15, 1909.

975,492.

Patented Nov. 15, 1910.
10 SHEETS—SHEET 3.

Fig. 3.

Witnesses:
R. E. Hamilton
M. Cox

Inventor,
F. E. Willits,
By F. G. Fischer, atty.

F. E. WILLITS.
WIRE FABRIC MACHINE.
APPLICATION FILED FEB. 15, 1909.

975,492.

Patented Nov. 15, 1910.
10 SHEETS—SHEET 6.

Witnesses:
R. Hamilton
M. Cox

Inventor,
F. E. Willits,
By F. G. Fischer, atty

F. E. WILLITS.
WIRE FABRIC MACHINE.
APPLICATION FILED FEB. 15, 1909.

975,492.

Patented Nov. 15, 1910.
10 SHEETS—SHEET 7.

Witnesses:

Inventor,
F. E. Willits,
By F. G. Fischer, Atty.

F. E. WILLITS.
WIRE FABRIC MACHINE.
APPLICATION FILED FEB. 15, 1909.

975,492.

Patented Nov. 15, 1910.
10 SHEETS—SHEET 10.

Witnesses:

Inventor,
F. E. Willits,
By F. G. Fischer,
Atty.

UNITED STATES PATENT OFFICE.

FREDERICK E. WILLITS, OF KANSAS CITY, MISSOURI, ASSIGNOR OF ONE-FOURTH TO WILLIAM M. ROOP, OF KANSAS CITY, MISSOURI.

WIRE-FABRIC MACHINE.

975,492.   Specification of Letters Patent.   Patented Nov. 15, 1910.

Application filed February 15, 1909. Serial No. 478,323.

*To all whom it may concern:*

Be it known that I, FREDERICK E. WILLITS, a citizen of the United States, residing at Kansas City, in the county of Jackson and State of Missouri, have invented certain new and useful Improvements in Wire-Fabric Machines, of which the following is a specification.

This invention has reference to wire fabric machines, and particularly to that class of machines wherein a stay fence is produced having the stays locked to the strands at their intersection by means of staples.

The invention comprises strand wire feeding devices; stay feeding devices consisting of an endless carrier, means for depositing the stays from the carrier on to the strands, staple feeding devices and means coöperating with such staple feeding devices for locking the bridges of the staples over the stays and their ends around the strands upon the opposite sides of the said stays.

The invention consists further of automatic crimping devices, also means for crimping the strands at the point of intersection of the stays, simultaneous with the locking of the stays to the strands.

The invention comprises details of construction to be hereinafter more specifically pointed out in the specification and claimed in the appended claims.

In order that my invention may be fully understood, reference will now be made to the accompanying drawings, in which.

In constructing my machine I employ a suitable frame 1, having a journaled longitudinal shaft 2, provided with a central drive pulley 3 and two cog-wheels 4, which latter are rigidly mounted upon the opposite ends of said shaft and mesh with and drive two larger cog-wheels 5, rigidly mounted upon a longitudinal shaft 6, journaled in the sides of the frame. Cog-wheels 5 rotate a feed-drum 7, step by step, by means of connecting-bars 8 pivoted at their forward ends to wrist-pins 9, projecting from the sides of the cog-wheels, and adjustably connected at their rear ends to the upper slotted ends 10, of arms 11 pivotally mounted at their lower ends upon the opposite ends of drum-shaft 12 and provided with gravity pawls 13, which engage and rotate ratchet-wheels 14, rigidly mounted upon the drum-shaft, one-sixth of a revolution at each backward thrust of arms 11. As arms 11 move forward to allow the pawls to engage the succeeding teeth on the ratchet-wheels, the drum is held stationary by the tension on the strand-wires, and by large ratchet-wheels 15, rigidly secured to the opposite ends of said drum and engaged by gravity pawls 16, pivotally secured to the machine frame, see Figs. 3 and 4. Shaft 12, upon which the drum is rigidly mounted, is journaled in brackets 17, secured to the rear portion of the machine frame.

Feed-drum 7 is divided into equal parts by six longitudinal rows of peripheral pins 18, which engage stay-wires 19 forming the transverse part of the fence, and draw them backward with the fence after they have been secured to strand-wires 20 forming the longitudinal portion of the fence.

The strand-wires are drawn from reels (not shown) through straighteners 21, preferably arranged at unequal distances apart in a bar 22 secured at its ends to the front portion of the frame. The strand-wires are also drawn through holes in a channel-bar 23 just in the rear of bar 22 and adapted to receive and guide the lower portion of a crimping-bar 24, which is depressed into contact with the strand-wires for the purpose of forming crimps 25 therein subsequent to each advancement of said strand-wires.

Crimping-bar 24 is elevated and depressed at regular intervals, by a pair of eccentric arms 26, operated by eccentrics 27, rigidly mounted upon a shaft 28 journaled in the ends of the machine frame and driven by shaft 6 through the instrumentality of sprocket-wheels 29 and 30, and a connecting sprocket-chain 31, (Figs. 4 and 5) the upper strand of which is depressed by an idler 32 to avoid contacting with a lower die-shoe 33, slidably arranged at its ends in the lower portion 33ª of T-shaped grooves in the sides of the machine frame, and carrying dies 34 with intersecting grooves 35 which receive the strand-wires and the stay-wires when the dies are elevated. The grooves for receiving the strand-wires have central depressions 35ª to form crimps 35ᶜ in said strand-wires for a purpose hereinafter described. Dies 34 are also provided with segmental grooves 36, which communicate with the depressions 35ª, and said dies are removably secured in the shoe 33 by pins 37 and wedges 38, which latter are held in position by bolts 39 and nuts 40, see Figs. 12 and 13.

Die-shoe 33 is provided at its underside with a pair of concave bearings 41, which rest upon cams 42, (Fig. 4) rigidly mounted upon shaft 6 and adapted, at each revolution, to elevate the die-shoe until dies 34 contact with the fence wires and raise them into contact with an upper set of dies hereinafter described. The lower dies are held in contact with the upper set until the fence wires have been secured together, by the concentric portions 43 of the cams 42.

Figure 1:
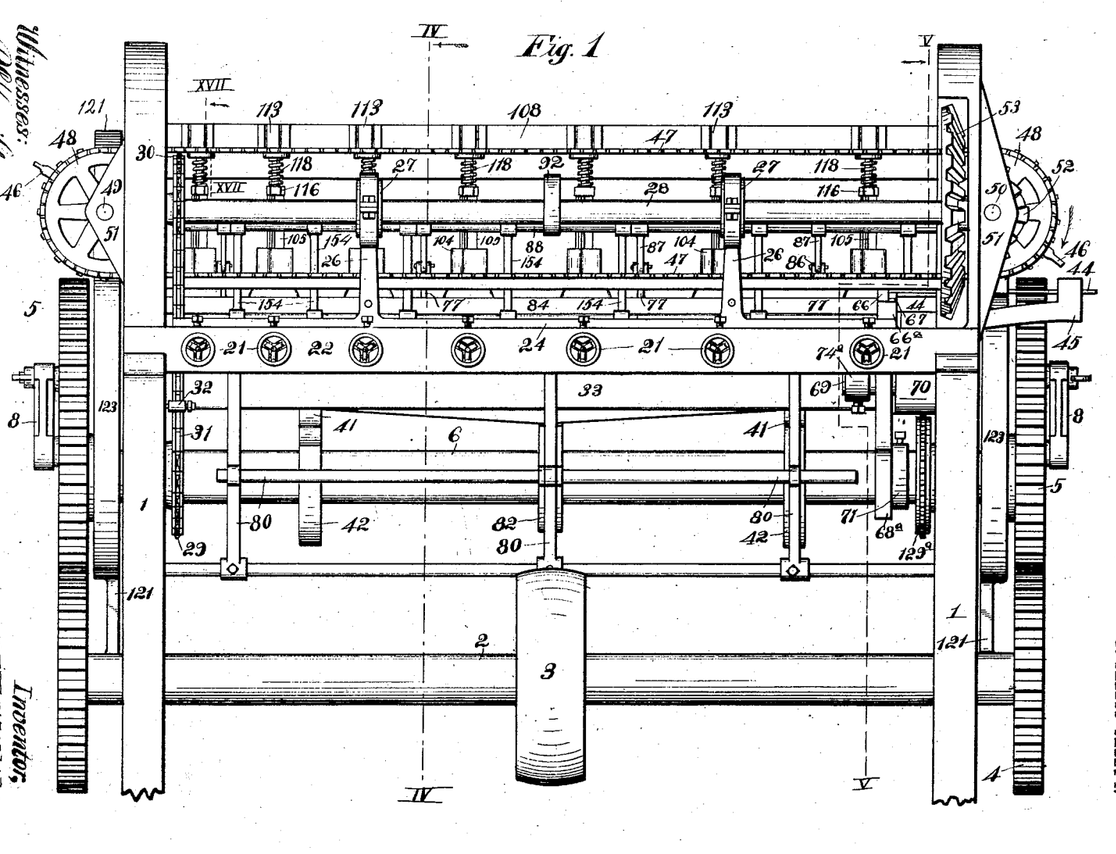
Figure 1 represents a front elevation of my improved machine with the hopper and its staple delivery mechanism omitted.
Figure 19:
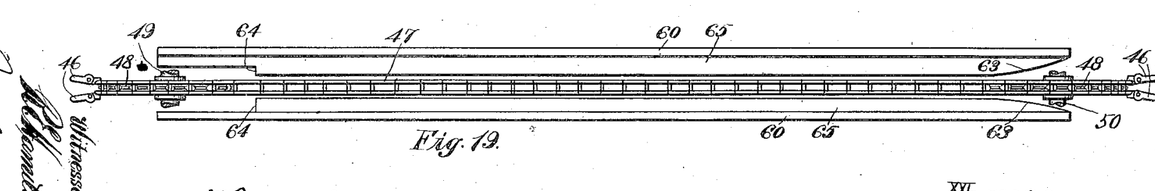
Fig. 19 is a detail plan view of an endless carrier, forming part of my invention.
Figure 24:
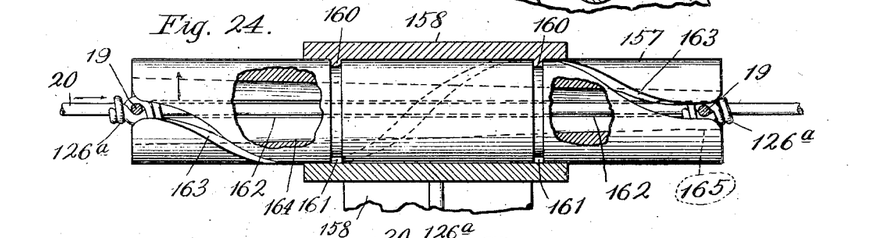
Figs. 24 and 25 are details of a device for bending the ends of the stay-wires down against the sides of the two adjacent strand-wires.
Figure 25:
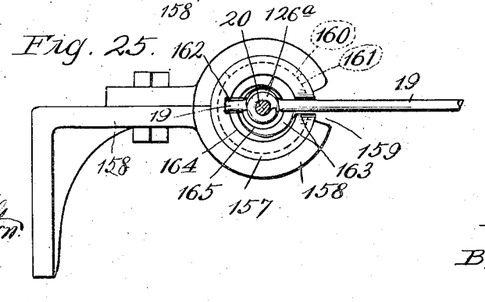
Figure 26:
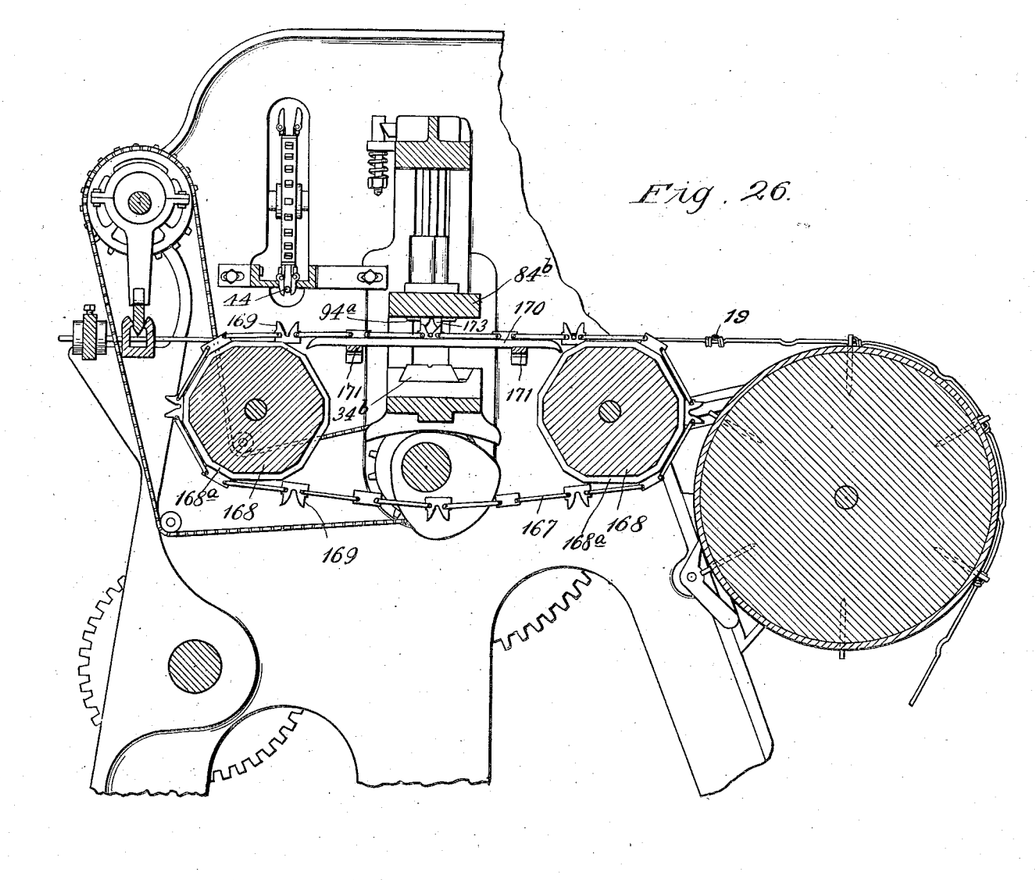
Figs. 26 to 31, inclusive, show modified means for conducting the stay-wires from the endless carrier to the dies, Fig. 31 being a section on line XXXI of Fig. 30.
Figure 27:
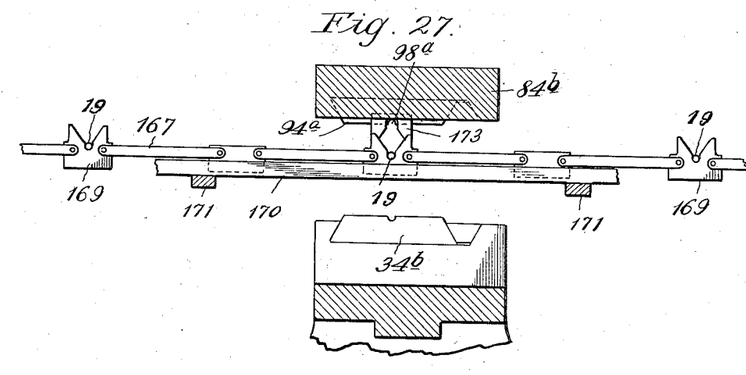
Figure 28:
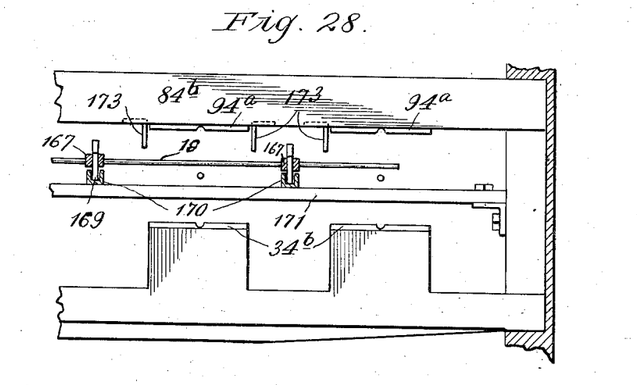
Figure 29:
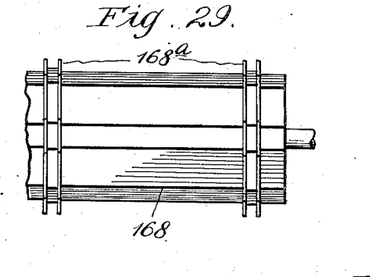
Figure 30:
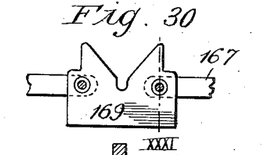
Figure 31:
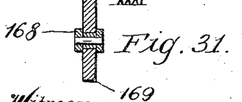

The stay-wires are supplied to the machine from a single strand 44 leading from a reel, (not shown) and extending through a straightener 45 secured to one end of the machine frame. The projecting end of the strand is grasped by a pair of gripping jaws 46 forming part of two sets of grippers equally spaced upon an endless sprocket-chain 47, connecting two sprocket-wheels 48 rigidly mounted upon shafts 49 and 50, journaled in bearings 51 on the ends of the machine frame, see Figs. 1, 3 and 19. Shaft 50 is driven by a small rigidly mounted bevel gear wheel 52, that meshes with and is driven by a large bevel gear wheel 53, rigidly mounted upon one end of shaft 28.

Figures 8, 9, 10, 11, 12, 13, 14, 15:
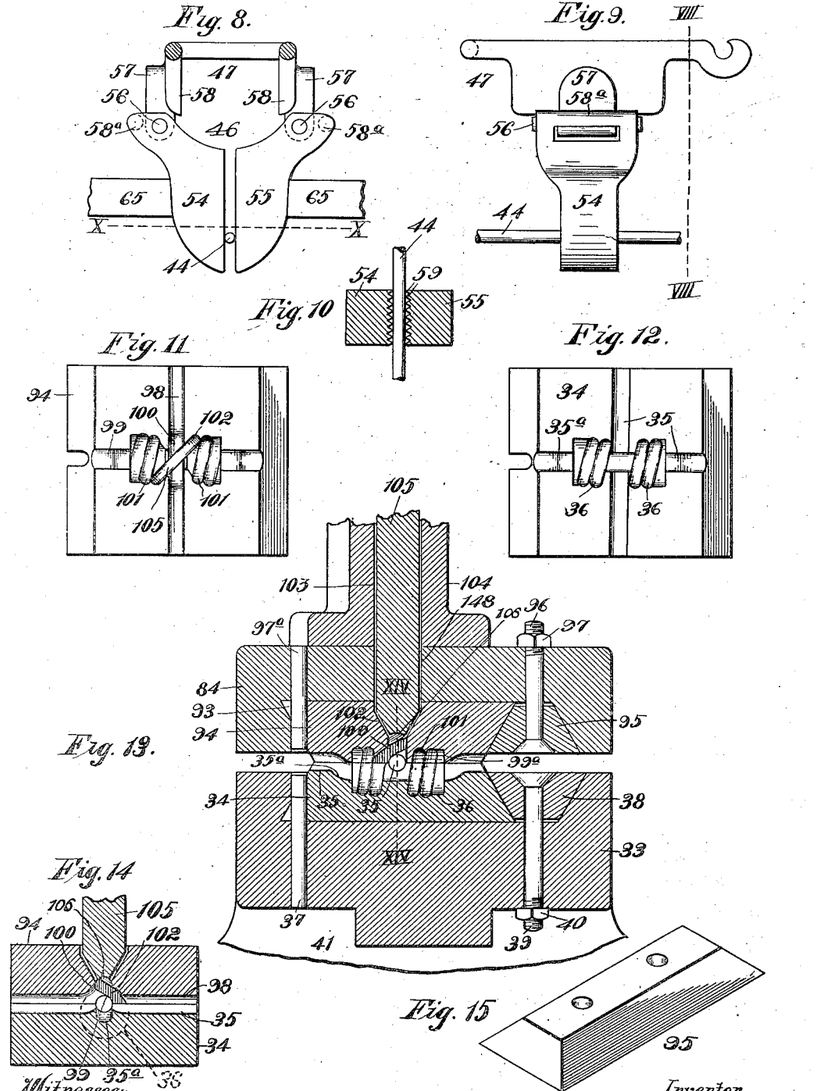
Fig. 8 is an enlarged detail view of the stay-wire gripping jaws, with their carrying chain in section, taken on line VIII—VIII of Fig. 9.
Fig. 9 is a side elevation of the same.
Fig. 10 is a transverse section of the gripping jaws taken on line X—X of Fig. 8.
Fig. 11 is an inverted plan view of one of the upper dies forming part of my invention.
Fig. 12 is a plan view of one of the lower dies.
Fig. 13 is a longitudinal sectional view, taken on line XIII—XIII of Fig. 6, showing an upper die and a lower die, located in their respective shoes and in position to receive one of the staples employed to secure the stay-wires to the strand-wires.
Fig. 14 is a transverse section of an upper die and a lower die, with the shoes omitted, taken on line XIV—XIV of Fig. 13.
Fig. 15 is a detail perspective view of one of the wedges employed to assist in holding the dies in their respective shoes.

Each set of gripping jaws consists of two members 54 and 55, which are pivoted at 56 to lugs 57 formed integral with flanges 58 on the opposite sides of two of the links forming part of sprocket-chain 47, see Figs. 8 and 9. The gripping-jaws are prevented from opening too wide when inverted, by integral stops 58ª which contact with lugs 57, and the inner sides of the jaws have teeth 59, which afford a reliable hold on wire 44, when closed upon the same by parallel angle-bars 60 arranged on opposite sides of the lower strand of the sprocket-chain 47 and adjustably secured at their opposite slotted ends 61, by bolts 62, to the sides of the machine frame, so that they may be adjusted laterally to exert the requisite amount of pressure on the gripping-jaws. As the gripping-jaws enter the space between the angle bars they are gradually closed by the flaring ends 63 of the same, against the free end of wire 44, which is seized and drawn along by said jaws to a point 64 near the opposite ends of the angle-bars where the inwardly extending flanges 65, of the same, are cut away to permit the jaws to open and release the wire. Said wire is then immediately severed by a blade 66, secured to an arm 66ª projecting from one side of the machine frame, and a knife 67, secured to the upper end of a lever 68, fulcrumed near its central portion upon a stub-shaft 69, projecting from a boss 70 on the inside of the machine frame, and having its lower terminal 68ª arranged in the path of an operating cam 71 rigidly mounted upon shaft 6, see Fig. 5. At each forward stroke of lever 68 its upper end, carrying the knife, is drawn back out of the path of the following pair of gripping-jaws by a retractile spring 72, secured at its ends to lever 68 and channel-bar 23.

Figures 17, 18, 20, 21, 22, 23:
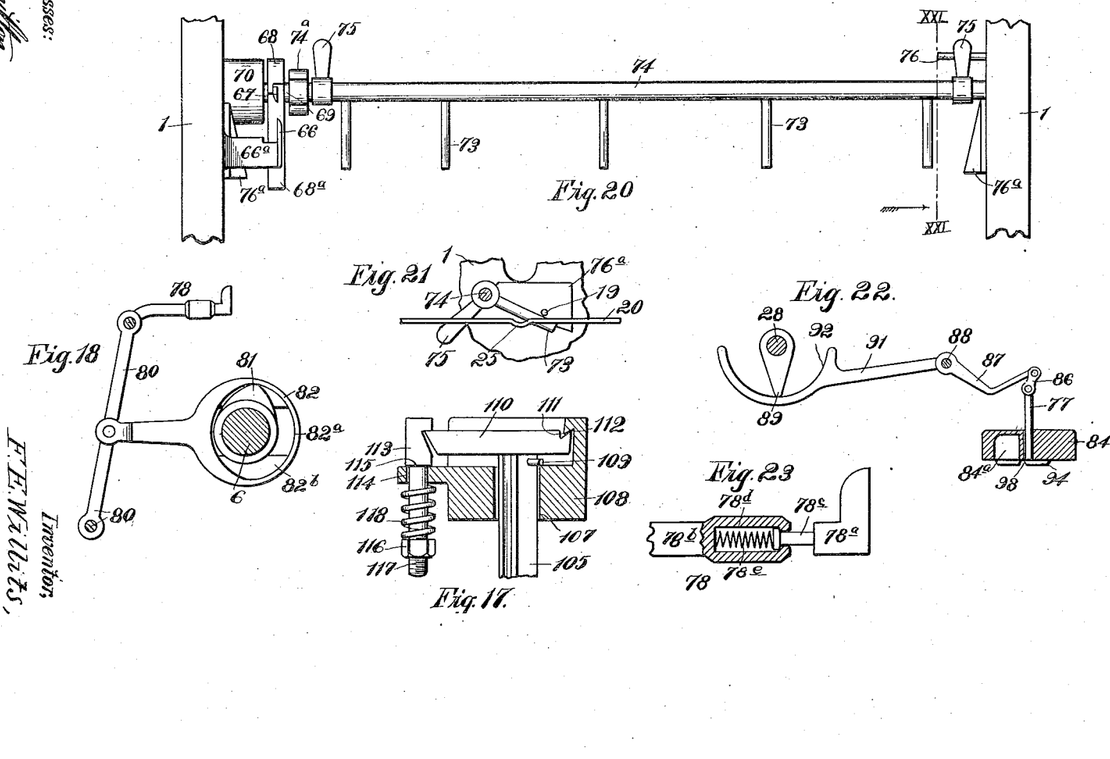
Fig. 17 is an enlarged detail side elevation, partly in section, of a portion of the trip mechanism for relieving the plungers from undue pressure.
Fig. 18 is a detail side elevation of one of the stay-wire push-bars and its operating mechanism.
Fig. 20 is a detail plan view of the cutting mechanism and the finger-bars forming part of the invention.
Fig. 21 is a transverse section taken on line XXI—XXI of Fig. 20.
Fig. 22 is a transverse section of the stop-pins forming part of the invention.
Fig. 23 is a detail sectional view of one of the push-bars forming part of the invention.

After wire 44 has been severed the resultant stay-wire falls upon finger-bars 73, arranged beneath the angle-bars and secured at their forward ends to a rod 74, pivoted at its ends in one side of the machine and in an arm 74ª, which latter is secured upon stub-shaft 69. Rod 74 is provided with counter-weights 75, one of which normally rests against a stop 76, (Fig. 4) secured to the inner surface of one of the sides of the machine, to normally hold the finger-bars in a horizontal position. After the stay-wire falls upon the finger-bars the free ends of the latter are depressed below the strand-wires (as shown in Fig. 21) upon which the stay-wire then rolls or slides and is adjusted laterally thereon by tapering shoulders 76ª, secured to the inner surfaces of the sides of the machine. After the stay-wire has been deposited upon the strand wires it is shoved backward into contact with depending stop-pins 77, by push-bars 78 supported in substantially a horizontal position by a transverse rod 79 and pivotally secured at their forward ends to the upper rod of a skeleton-frame 80, pivotally secured at its lower portion in the sides of the machine and oscillated by an internal cam 81, rigidly mounted upon shaft 6, and an arm 82 operatively connecting the cam to the skeleton-frame.

Push-bars 78 are composed of two sections 78ª and 78ᵇ, the former of which has a reduced front portion 78ᶜ that operates in a recess 78ᵈ in the last mentioned section, said recess being provided with an expansion spring 78ᵉ (Fig. 23) which holds section 78ª in contact with the stay-wire while being raised by the die-shoe 33, and thus reliably holds said stay-wire in contact with the stop-pins 77.

At each forward stroke of frame 80, its upper rod contacts with counter-weights 75, tilting the same upwardly to rotate rod 74 and cause the depression of the free ends of finger-bars 73, so they will discharge the stay-wire as above described.

Figure 4:
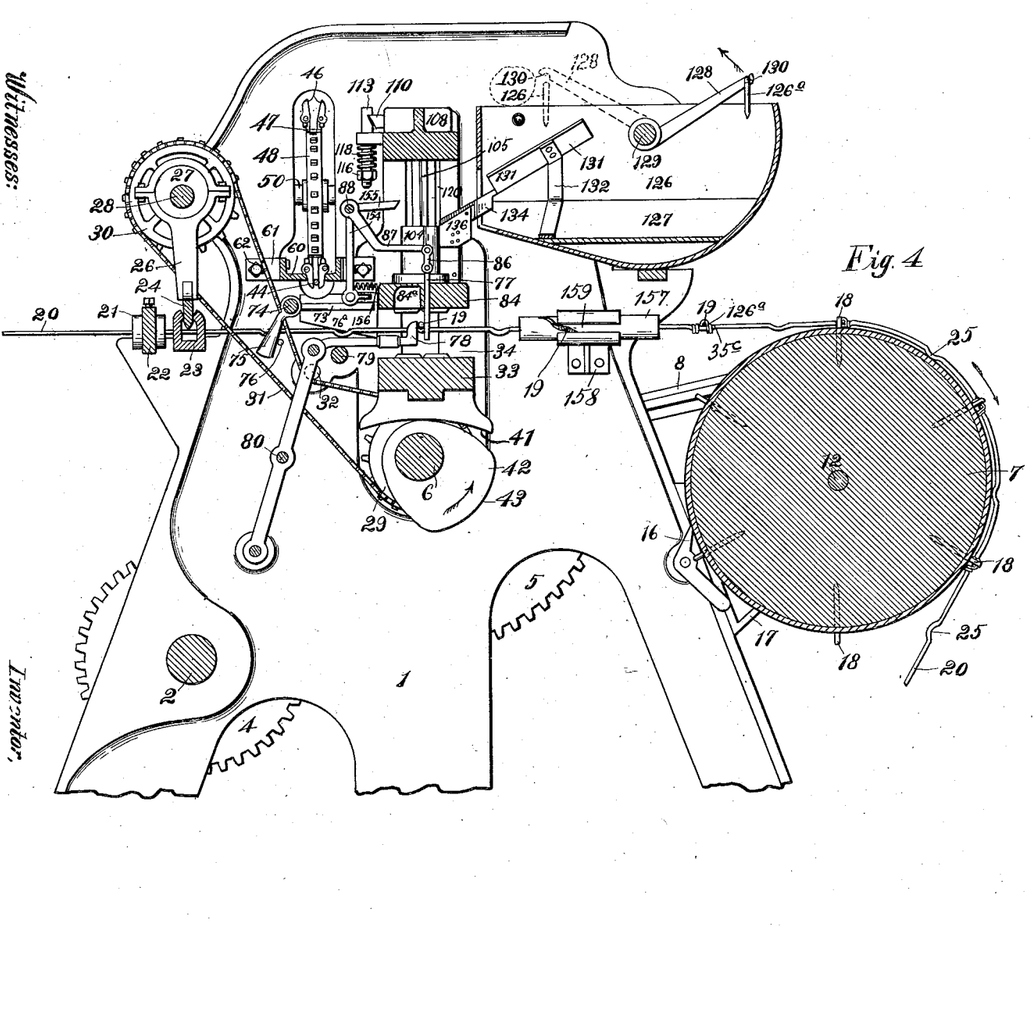
Fig. 4 is a vertical transverse section of the machine taken on line IV—IV of Fig. 1.
Figure 5:
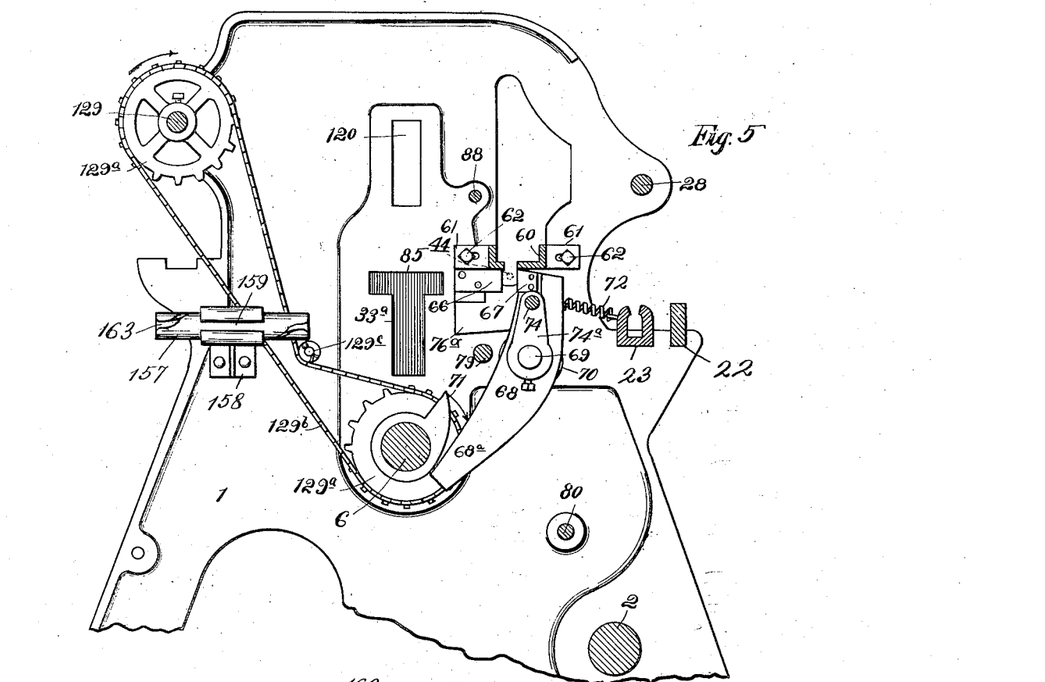
Fig. 5 is an irregular, broken, detail transverse section, with certain parts omitted, taken on line V—V of Fig. 1, showing the stay-wire cutting mechanism.

The depending stop-pins extend through openings in an upper stationary die-shoe 84, secured at its ends in the upper portion 85 of the T-shaped grooves, and said stop-pins depend from links 86 pivoted to the rear ends of arms 87, rigidly mounted upon a longitudinal rod 88, pivoted in the sides of the machine, see Figs. 4 and 22.

The stop-pins are raised with the strand-wires and the stay-wire by the lower die-shoe 33, and retained in an elevated position, after said die-shoe is lowered, by a cam 89 and an arm 91, until the wires have been stapled, lowered, and moved backward to bring the stay-wire in the rear of the stop-pins before the same descend. The rear ends of the push-bars are also raised by the lower die-shoe 33 and hold the stay-wire against the stop-pins 77, the lower side of the upper die-shoe 84 having cavities 84ª to receive said rear ends of the push-bars.

While the rear ends of the push-bars are being raised cam 81 is in engagement with the concentric side 82ª of an irregular aperture 82ᵇ, in the enlarged rear end of arm 82, and consequently, the latter remains in its rearmost position until die-shoe 33 descends and permits the ends of the push-bars to leave the cavities 84ª. After the rear ends of the push-bars leave cavities 84ª, they are moved forward to engage another stay-wire by cam 81 rotating into contact with the eccentric side of aperture 82ᵇ.

Cam 89 is rigidly mounted upon the central portion of shaft 28, and arm 91 is rigidly secured at its rear end to rod 88 and has a semicircular forward end 92 which is held in a depressed position by the cam during a portion of its revolution, see Fig. 22. After the cam rotates out of contact with the semicircular end 92, the stop-pins descend by gravity, or by pressure of a spring, not shown, in time to intercept the following stay-wire.

The upper die-shoe 84 is provided at its underside with dovetail recesses 93, to receive dies 94 corresponding in number to dies 34, vertically above which they are held by wedges 95, secured in place by bolts and nuts 96 and 97, and pins 97ª, see Fig. 13. The underside of dies 94 have intersecting grooves 98 and 99, which register with grooves 35. Grooves 98 also communicate with semicircular recesses 100, the sides of which crimp the stay-wire where it intersects the strand-wires, in order to prevent it from slipping longitudinally after being secured to the same.

The depressed portions 99ª of grooves 99, are interrupted by inclined segmental grooves 101, the ends of which register with the ends of segmental grooves 36 and form in conjunction therewith, when the dies are closed upon the fence wires, two sets of spiral grooves arranged on opposite sides of the stay-wire groove and adapted to receive and force the opposite ends of the staples around the crimped portions 35ᶜ in the strand-wires. The ends of said crimped portions contact with the coiled ends of the staples and thus secure the same from lateral movement.

Dies 94 have centrally located, diagonal, tapering apertures 102, communicating at their lower reduced ends with the inner ends of segmental grooves 101, and at their upper ends with passageways 103 in guides 104, secured upon die-shoe 84 to receive plungers 105 having grooved concave lower ends 106, which snugly fit the bridges of the staples while the latter are being forced into the spiral grooves by said plungers. The upper ends of the plungers project through openings 107 in a longitudinal bar 108, to which they are secured by transverse pins 109 and a trip mechanism, (Fig. 17) which latter is provided to relieve the plungers of undue pressure when forcing the staples into the spiral grooves. Said trip mechanism consists of levers 110 fulcrumed at their rear notched ends 111, in V-bearings 112 on the upper notched ends of bolts 113 held in apertures 114, in the bar, by integral shoulders 115 and nuts 116, which latter adjustably engage the lower threaded ends 117 of the bolts in order to tension springs 118, embracing the bolts and interposed between bar 108 and nuts 116. Springs 118 are tensioned sufficiently to resist the ordinary pressure to which the plungers are subjected, but should one of the staples become clogged in one of the spiral grooves the spring will yield and relieve that particular plunger from continuing to move down with bar 108, consequently, as the latter moves down it will depress the engaging rear end of lever 110 and cause the forward end of the same to raise and elevate the engaging bolt 113 against the pressure of spring 118. After lever 110 has been tilted to a certain degree, which is regulated by the extent of its engaging surface with the top of the notch in bolt 113, it becomes disengaged from said bolt and then, of course, exerts no further pressure upon the plunger.

Figure 3:
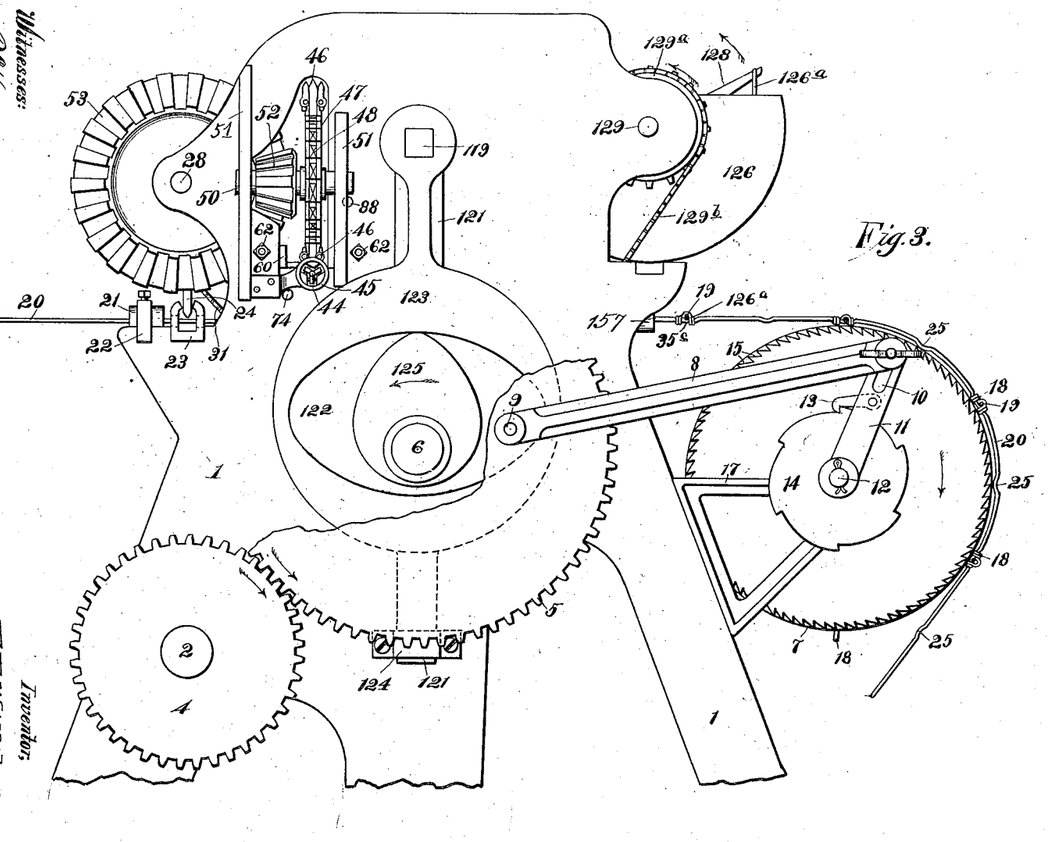
Fig. 3 is a side elevation of the machine.

Bar 108 has reduced terminals 119 which project through slots 120, in the sides of the machine, and are secured in the upper ends of arms 121 having elliptical apertures 122 in their enlarged portions 123, see Fig. 3. The lower ends of arms 121 extend through guides 124 secured to the sides of the machine, and are reciprocated by cams 125 rigidly mounted upon the terminals of shaft 6 and adapted to alternately engage the upper and lower walls of the elliptical apertures 122.

Figure 2:
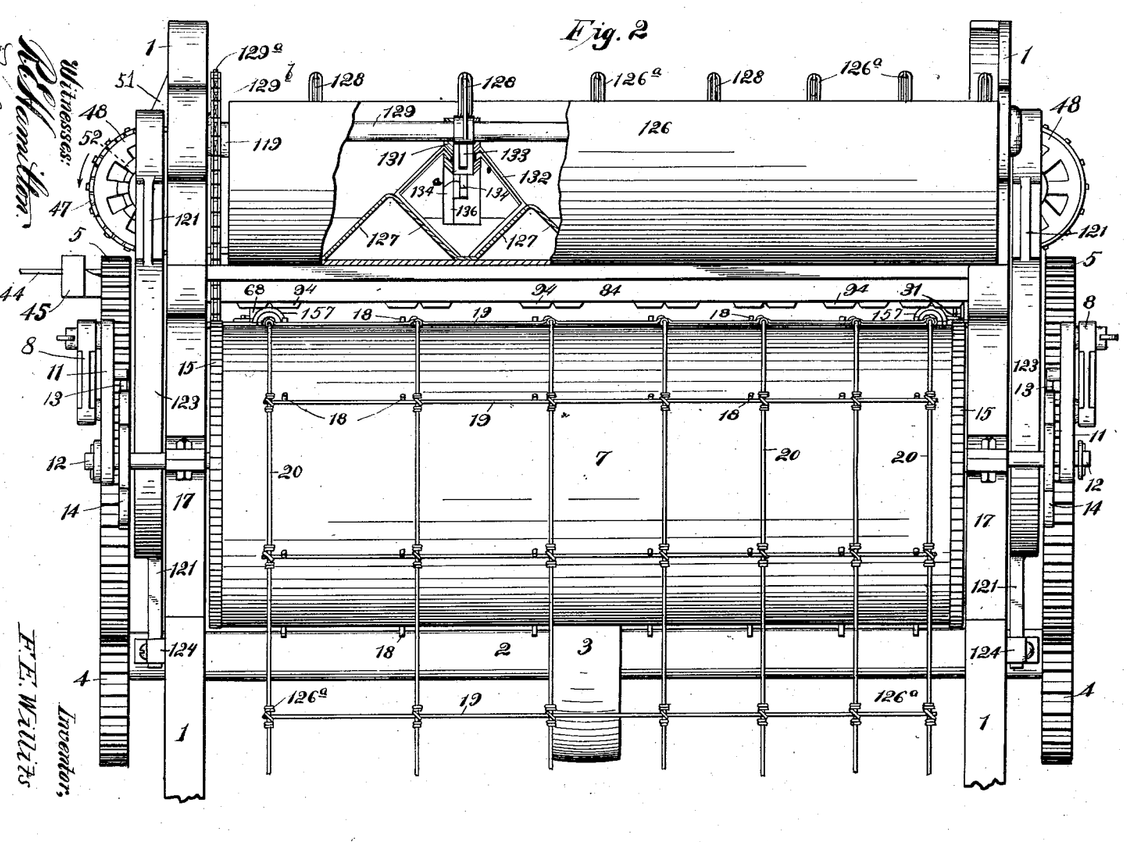
Fig. 2 is a rear view of the same.

Staples 126ª, are fed to the dies from a hopper 126 (Figs. 2, 4, and 6), extending across the upper rear portion of the machine and having a false zig-zag bottom 127 for conducting the staples into the paths of a series of crank-arms 128, rigidly mounted upon a shaft 129, driven by sprocket-wheels 129ª and a connecting endless sprocket-chain 129ᵇ, held out of contact with the lower die-shoe by an idler 129ᶜ. Crank-arms 128 are provided at their outer ends with notches 130, so that they may pick up and hold the staples until they reach the position shown by dotted lines in Fig. 4, when the staples fall upon inclined troughs 131 supported by arms 132, and having longitudinal slots 133 to permit the passage of the crank-arms.

The staples slide down from the troughs upon inclined levers 134 (Fig. 7) fulcrumed at 135 between the depending flanges 136 of chutes 137, supported from the upper die-shoe by vertical arms 138, said levers being bent at an angle of 45 degrees to direct the staples to openings 139 leading to the passageways in guides 104.

Should the staples be fed too rapidly to chutes 137 and accumulate upon levers 134, the latter will, when their upper ends are overbalanced by the weight of said staples, tip and discharge all or a number of the staples back into the hopper and thus prevent the clogging of troughs 131. After the levers have thus disposed of the surplus staples, their forward ends will again drop to their normal position and rest upon stop-pins 134ª secured to the depending flanges 136. As the staples slide from the lower ends of the levers onto chutes 137, they are stopped by lugs 140, thereon, from which they are released at regular intervals by segmental levers 141, fulcrumed at 142 between the lower ends of flanges 136, and provided with upwardly projecting fingers 143, adapted to pass upwardly through slots 144 in the chutes, to engage and lift the staples, one by one, over the lugs so they may slide down against the sides of the plungers.

Figures 6, 7, 16:
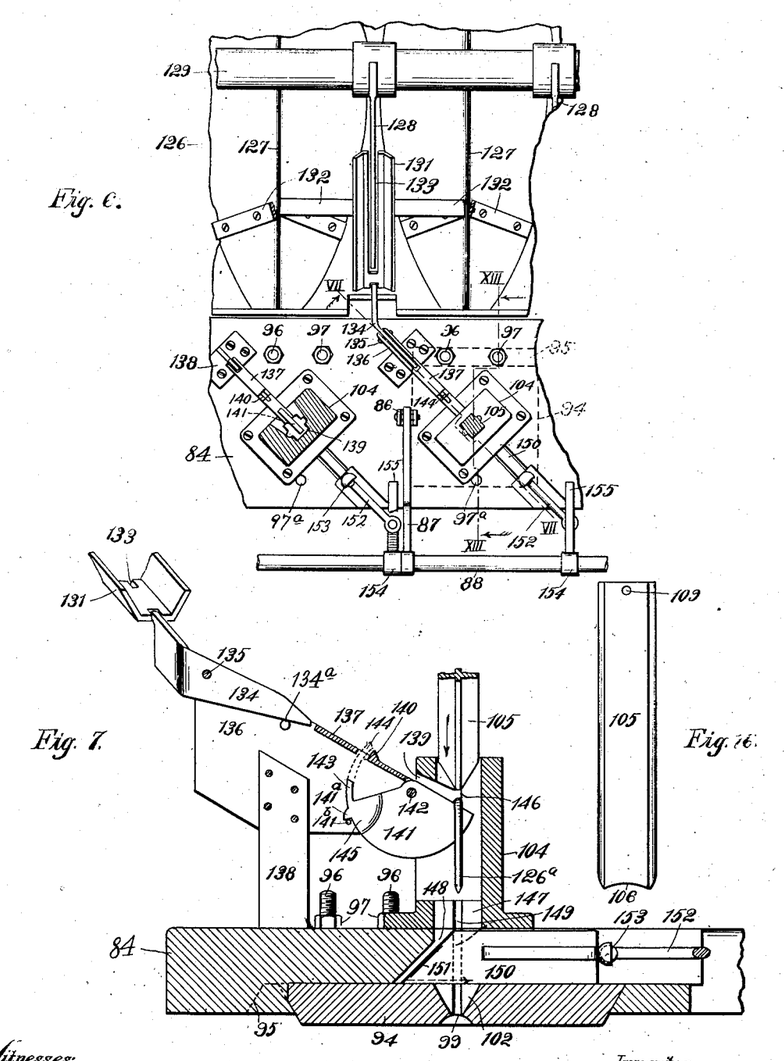
Fig. 6 is an enlarged, broken, detail plan view of a portion of the staple feeding mechanism.
Fig. 7 is a vertical transverse section of the same, with the hopper omitted, taken on line VII—VII of Fig. 6.
Fig. 16 is a detail front elevation of one of the plungers employed to force the staples into the segmental grooves in the dies.

When the plungers are raised to the position shown in Fig. 7, the weighted ends 145 of levers 141, drop and tip up the opposite ends of said levers in time to catch the staples as they slide down against shoulders 146 in the plunger guides. Said opposite ends of the levers are prevented from tipping up too far by lugs 141ª on their weighted ends, which contact with stops 141ᵇ secured to depending flanges 136.

Guides 104 have lower openings 147, which communicate with openings 148 extending through shoe 84 and communicating with openings 102 in the upper die. Openings 147 and 148 communicate with oppositely-disposed grooves 149, the walls of which maintain the staples in a vertical position as they pass down through said openings.

The staples are subjected to but slight pressure from the plungers, in their passage to openings 148, but when passing through said openings their lower ends are forced around the strand-wires, which operation requires considerable pressure, and in order to prevent the bridges of the staples from bending under this pressure, I sustain them by means of sliding supports 150, extending into openings 148. Supports 150 have tapered inner ends 151, which support the bridges of the staples in their downward passage as the supports are drawn outwardly by links 152, connected at one end to the outer ends of the supports by ball-and-socket joints 153, and pivotally secured at their opposite ends to the depending arms 130 of bell-crank levers 154, the upper arms 155 of which project into the path of and are depressed on the downward movement of bar 108. When bar 108 is raised out of contact with arms 155, supports 150 are immediately returned to their inner positions by retractile springs 156, connected at their opposite ends to the shoe 84 and the depending arms of the bell-crank levers 154.

As levers 141 are operated by the plungers it is obvious that only one staple at a time can be placed below each plunger and, consequently, danger of clogging the dies by attempting to force into each more than one staple at a time is obviated.

The projecting ends of the stay-wires are bent down against the sides of the adjacent strand-wires to make the selvages of the fabric comparatively smooth, by means of a pair of rollers 157, journaled in brackets 158, secured to the rear side portions of the machine frame, and provided with longitudinal slots 159 and segmental ribs 160, which latter enter peripheral grooves 161 in the rollers, and thus prevent the same from moving longitudinally. Each roller has an internal longitudinal groove 162 and a spiral slot 163, communicating with a bore 164 tapering toward its outlet end 165.

The two strand-wires forming the selvages of the fabric or fence, are threaded through the bores of the rollers 157, hence as the fence is drawn backward by drum 7, the ends of each stay-wire will enter the forward ends of grooves 162 and slots 163, and engaging the sides of the latter will, in passing to the rear ends of the rollers, rotate the same one revolution.

As the rollers rotate they will, through the intermediacy of the walls of grooves 162, carry the projecting ends of the stay-wires downward against the sides of the strand-wires, and thus form smooth selvages. As the rollers are slightly longer than the spaces between the stay-wires, the ends of each succeeding stay-wire will enter the spiral slots 163 before the ends of the preceding stay-wire leaves said slots, hence the rollers will always be ready to receive the ends of the stay-wires as the same move backward step by step.

In the modified form shown in Figs. 26 to 31, inclusive, for conducting the stay-wires in position between the upper and the lower dies, 167 designates a plurality of endless chains, arranged to travel around a plurality of rollers 168, journaled in the sides of the frame. Chains 167 include bifurcated links 169 which are so spaced that each time the chains pause, one of said links will be in proper position between the upper and lower dies to deliver a stay-wire 19 thereto, and another of said links will be in position beneath the endless carrier to receive a stay-wire. The chains are moved forward step by step by the stay-wires after the same have been secured by the staples to the strand-wires.

In order to prevent the upper strands of the chains from sagging with the stay-wires, I support said strands by means of a plurality of grooved rails 170, supported by cross-bars 171, secured to the sides of the frame.

The upper die-shoe 84$^b$ is provided with bifurcated guides 173, which guide the stay-wires into grooves 98$^a$ in the upper dies 94$^a$, when said stay-wires are pushed upward by the lower dies 34$^b$.

Rollers 168 are provided with peripheral guides 168$^a$, which prevent the endless chains from moving laterally thereon.

Having thus described my invention, what I claim is:—

1. A wire fence machine, consisting of automatic means for feeding a number of strand-wires, an endless carrier embodying jaws, means for automatically closing the jaws upon a wire so they will conduct the latter transversely to the strand-wires, a knife for severing the transverse wire into suitable lengths, and means for securing the resultant stay-wires upon the strand wires.

2. A wire fence machine, consisting of automatic means for feeding a number of strand-wires, an endless carrier embodying jaws, angle-irons for closing the jaws upon a transverse wire, means for severing said wire into suitable lengths, and means for securing the resultant stay-wires at intervals upon the strand-wires.

3. A wire fence machine, consisting of automatic means for feeding a number of strand-wires, an endless carrier embodying jaws arranged in pairs, adjustable angle-irons for closing the jaws upon a transverse wire, means for severing said wire into suitable lengths, and means for securing the resultant stay-wires at intervals upon the strand-wires.

4. A wire fence machine, consisting of automatic means for feeding a number of strand-wires, an endless carrier embodying jaws, means for limiting the movement of said jaws, angle-irons for closing the jaws upon a transverse wire, means for severing said wire into suitable lengths, and means for securing the resultant stay-wires at intervals upon the strand-wires.

5. In a wire fence machine, means for feeding a number of strand-wires, a crimping-bar adapted to crimp the strand-wires at intervals, and a channel-bar through which the strand-wires pass and in which the crimping-bar reciprocates across said strand-wires.

6. In a wire fence machine, in combination, means for feeding a plurality of strand-wires, a channel bar extending transversely of the strand-wires and having a plurality of passage-ways therethrough through which said strand-wires are adapted to pass, and a crimping bar adapted to be received in said channel-bar and mounted to be reciprocated in said channel-bar across said strand wires.

7. In a wire fence machine, a fixed upper die, a movable lower companion die, said upper and lower dies having registering grooves to receive the strand and stay wires and recesses to receive the staple, and a plunger reciprocatively mounted to enter said fixed die from the rear and seat therein, and having a die end adapted to form a continuation of said registering grooves when in said seated position.

8. In a wire fence machine, dies provided with intersecting grooves to receive the intersecting portions of the strand and stay-wires forming the fence, spiral grooves communicating with the intersecting grooves, and passage-ways communicating with the spiral grooves; plungers operatively arranged in said passage-ways and adapted to force the ends of staples into the spiral grooves, and movable supports to sustain the bridges of the staples.

9. In a wire fence machine, dies provided with grooves and a passage-way leading thereto, a staple chute leading to the passage-way, a stop on said staple chute, and a lever adapted to raise the staples over the stop.

10. A staple chute provided with a slot, a stop located at one end of the slot, and a lever having a finger adapted to pass through the slot and raise the staples over the stop.

11. A staple feeding mechanism, consisting of a hopper provided with a plurality of angular ridges in its bottom, crank-arms rotatably mounted to operate between said ridges and adapted to pick up the staples in their path, and a chute into which the staples are thrown from said crank-arms.

12. In a wire fence machine, the combination of strand-wire feeding devices, stay feeding devices comprising an endless carrier, means for depositing the stays from the carrier on to the strands, means for moving the stays along the strands to the place of locking the said stays and strands, staple feeding devices, and means for locking the staples over the stays and around the strands, substantially as specified.

13. In a wire fence machine, the combination of strand wire feeding devices, endless stay feeding devices, means for receiving the stays from the endless feeder and depositing them upon the strands, staple feeding devices, means for locking the staples over the stays and around the strands at the point of intersection of the said stays and strands, and means for crimping the strands at their point of locking simultaneously with the placing of the staples, substantially as specified.

14. In a wire fence machine, the combination of strand wire feeding devices, an endless stay carrier provided with gripping-jaws, means for depositing stays from the carrier on the strands, staple feeding devices, means for locking the staples over the stays and around the strands, and means coöperating with the devices for locking the staples to simultaneously crimp the strands at the point of intersection of the stays during the locking of the staples around the said stays and strands, substantially as specified.

15. In a wire fence machine, the combination of strand wire feeding devices, a reciprocating stay carrier, oscillatory means for receiving the stays from the carrier and depositing them upon the strands, staple feeding devices, and means for locking the staples over the stays and around the strands at the intersection of the said stays and strands, substantially as specified.

16. In a wire fence machine, the combination of strand wire feeding devices, a movable stay carrier, stay gripping devices on said carrier, oscillatory means for receiving the stays from the carrier and depositing them upon the strands, staple feeding devices, and mechanism for locking the bridge of the staples over the stays and reversely wrapping the ends of the staples around the strands upon the opposite sides of the stays, substantially as specified.

17. In a wire fence machine, the combination of strand-wire feeding devices, a transversely movable stay carrier, a tilting support disposed beneath the carrier and adapted to receive the stays therefrom and deposit them upon the strands, means operating at predetermined intervals for tilting said support, staple feeding devices, and means for locking the staples over the stays and around the strands, substantially as specified.

18. In a wire fence machine, the combination of strand wire feeding devices, a transversely movable stay carrier, a tilting support adapted to receive the stays and deposit them upon the strands, means for tilting said support, a movable and immovable die, a staple receptacle, means for feeding the staples to the dies, and mechanism for bringing the movable die adjacent to the immovable die to lock the staples over the stays and around the strands, substantially as specified.

19. In a wire fence machine, the combination with strand wire and stay wire feeding devices, of a movable and immovable member, a staple receptacle, means for conveying staples from the receptacle to the immovable member, means for bringing the movable member in juxtaposition to the immovable member to facilitate in locking the staples over the stays and around the strands, and means carried by the said members for crimping the strands simultaneously with the locking of the stays thereto, substantially as specified.

20. In a wire fence machine, the combination of strand wire feeding devices, a tilting stay support, means for depositing stays on said support, an oscillatory frame adapted to tilt the aforesaid support, push-bars attached to said oscillatory frame adapted to receive the stays from the tilting support and properly position them on the strands, staple feeding devices, and means for locking the staples over the stays and around the strands, substantially as specified.

21. In a wire fence machine, the combination of strand-wire feeding devices, a movable stay carrier, a tilting support interposed between the carrier and the path of the strands, means for tilting said support, longitudinal movable devices adapted to project the stays along the strands to the position of locking the same thereto, stop-pins coöperating with such devices, a staple receptacle, means for feeding the staples from the receptacle to the intersection of the stays and strands, and means for locking the staples over the stays and around the strands, substantially as specified.

22. In a wire fence machine, the combination with strand-wire feeding devices, a transversely movable stay carrier provided with a series of gripping-jaws, means for depositing the stays from the carrier onto the strands, longitudinal movable members for properly positioning the stays on the strands, a staple receptacle, transversely-disposed die-shoes, one overlying the other between which the strand-wires are projected, dies attached to said shoes, a series of feedways leading from the receptacle to the dies, and mechanism for bringing the die-shoes co-adjacent to facilitate in locking the staples over the stays and around the strands, substantially as specified.

23. In a wire fence machine, the combination of strand-wire feeding devices, an endless stay carrier provided with a series of jaws thereon, adjustable means for closing said jaws, a tilting support for receiving the stays from the carrier and depositing the same upon the strands, oscillatory means adapted to tilt said support, means carried on said oscillatory means adapted to receive the stays from the tilting support and position the same upon the strands, staple feeding devices, feeding devices adapted to coöperate with the last-named members, and means for locking the staples over the stays and around the strands, substantially as specified.

24. In a wire-fence machine, the combination of strand-wire feeding devices, an endless stay carrier, means for depositing said stays from the carrier on the strands, a reciprocating member adapted to actuate said last-named means, push-bars carried by said member adapted to properly position the stays upon the strands, staple feeding devices, means for locking the staples over the stays and around the strands, and means coöperating with the means for locking the staples to simultaneously crimp the strands at the point of intersection of the stays during the locking of the staples around the said stays and strands, substantially as specified.

25. In a wire fence machine, a selvage forming means comprising a member adapted to inclose the strand wire axially therein, and adapted to revolve therearound, said revoluble member being provided with continuous means to engage the end of the said wire to draw the latter around said strand wire.

26. In a wire fence machine, a selvage forming roll having a tubular opening through which the strand wire is adapted to extend, and having means communicating with said tubular opening continuously throughout the length and periphery of said roll, whereby the end of the said wire may be drawn around said strand wire.

27. In a wire fence machine, selvage forming means comprising a hollow cylindrical roll through which the strand wire extends, said roll being constructed to permit the end of the strand wire to project radially therein, and to cause said roll to revolve as the strand wire is forwardly moved.

28. In a wire-fence machine, tubular selvage forming rollers through which two of the strand-wires of the fence are threaded, said rollers having spiral slots and internal grooves to receive the ends of the stay-wires of the fence, for the purpose described.

29. In a wire fence machine, the combination of strand feeding means, stay feeding means and means for tying the strands and stays, said tying means including opposing dies having intersecting registering grooves to form a passage-way in which said strands and stays are held and which is curved downwardly to crimp the strands when the tie is made.

30. In a wire fence machine, the combination of strand feeding means, stay feeding means, means for applying ties to the intersections of said strands and stays, and a roll to inclose the outer strands, the ends of the stays and said ties to roll the latter into a smooth selvage.

31. In a wire fence machine, the combination of a fixed upper die bar, a movable lower die bar, means for feeding stays between said upper and lower die bars, plungers movable through said fixed die bar, and a bar mounted to reciprocate above said fixed die bar to move said plungers.

32. In a wire fence machine, the combination of a fixed upper die bar, a movable lower die bar, means for feeding stays between said upper and lower die bars, plungers movable through said fixed die bar, a bar mounted to reciprocate above said fixed die bar to move said plungers, and tripping connections between said reciprocating bar and said plungers.

In testimony whereof I affix my signature, in the presence of two witnesses.

FREDERICK E. WILLITS.

Witnesses:
F. G. FISCHER,
M. COX.